(12) United States Patent
Hu et al.

(10) Patent No.: US 9,383,526 B2
(45) Date of Patent: Jul. 5, 2016

(54) OPTICAL FIBER CONNECTOR

(75) Inventors: Guanpeng Hu, Shanghai (CN); Jianhua Wang, Shanghai (CN)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 14/391,936

(22) PCT Filed: Apr. 27, 2012

(86) PCT No.: PCT/CN2012/074814
§ 371 (c)(1),
(2), (4) Date: Oct. 10, 2014

(87) PCT Pub. No.: WO2013/159331
PCT Pub. Date: Oct. 31, 2013

(65) Prior Publication Data
US 2015/0117822 A1    Apr. 30, 2015

(51) Int. Cl.
*G02B 6/36* (2006.01)
*G02B 6/38* (2006.01)

(52) U.S. Cl.
CPC ............ *G02B 6/3858* (2013.01); *G02B 6/3806* (2013.01); *G02B 6/3847* (2013.01); *G02B 6/3849* (2013.01); *G02B 6/3846* (2013.01); *G02B 6/3887* (2013.01); *G02B 6/3893* (2013.01)

(58) Field of Classification Search
CPC ... G02B 6/3849; G02B 6/3806; G02B 6/3858
USPC ............... 385/60, 76–78, 81, 85–87
See application file for complete search history.

(56) References Cited

U.S. PATENT DOCUMENTS

| 5,337,390 | A |   | 8/1994  | Henson    |                      |
|-----------|---|---|---------|-----------|----------------------|
| 5,414,790 | A | * | 5/1995  | Lee       | ........ G02B 6/3849 |
|           |   |   |         |           | 385/134              |
| 5,563,974 | A | * | 10/1996 | Carpenter | ........ G02B 6/25   |
|           |   |   |         |           | 385/139              |
| 7,280,733 | B2|   | 10/2007 | Larson    |                      |
| 7,340,146 | B2| * | 3/2008  | Lampert   | ........ G02B 6/3849 |
|           |   |   |         |           | 385/134              |
| 7,775,726 | B2|   | 8/2010  | Pepin     |                      |
| 8,070,367 | B2|   | 12/2011 | Winberg   |                      |

(Continued)

FOREIGN PATENT DOCUMENTS

| CN | 102116912 | 7/2011 |
| CN | 102122031 | 7/2011 |

(Continued)

OTHER PUBLICATIONS

International Search Report for PCT International Application No. PCT/CN2012/074814, mailed on Feb. 7, 2013, 7pgs.

(Continued)

*Primary Examiner* — Robert Tavlykaev
(74) *Attorney, Agent, or Firm* — Gregg H. Rosenblatt

(57) ABSTRACT

An optical connector for terminating an optical fiber comprises a housing configured to mate with a receptacle and a collar body disposed in the housing. The collar body includes a ferrule securely disposed in an opening of the collar body, the ferrule including a housing portion to receive a gripping device to grip an optical fiber. A backbone retains the collar body within the housing and includes a fiber jacket clamping portion to clamp a jacket portion of the optical fiber. A boot is attachable to a portion of the backbone, wherein the boot actuates the fiber jacket clamping portion of the backbone upon attachment of the boot to the backbone.

8 Claims, 9 Drawing Sheets

(56) References Cited

U.S. PATENT DOCUMENTS

| | | |
|---|---|---|
| 8,118,494 B2 | 2/2012 | Larson |
| 8,573,859 B2 | 11/2013 | Larson |
| 8,851,765 B2 | 10/2014 | Larson |
| 2005/0220434 A1* | 10/2005 | Hsieh .................. G02B 6/3849 385/134 |
| 2008/0226236 A1 | 9/2008 | Pepin et al. |
| 2010/0290740 A1* | 11/2010 | Ohtsuka ................. G02B 6/382 385/60 |
| 2011/0044588 A1 | 2/2011 | Larson |

FOREIGN PATENT DOCUMENTS

| | | |
|---|---|---|
| CN | 102122032 | 7/2011 |
| CN | 102272646 | 12/2011 |
| CN | 202794603 U | 3/2013 |
| JP | 3445479 | 6/1999 |
| WO | WO 2006-019515 | 2/2006 |
| WO | WO 2006-019516 | 2/2006 |
| WO | WO 2009-051918 | 4/2009 |
| WO | WO 2009-148797 | 12/2009 |
| WO | WO 2010-120570 | 10/2010 |
| WO | WO 2010/123670 | 10/2010 |
| WO | WO 2010-132187 | 11/2010 |
| WO | WO 2011-025929 | 3/2011 |
| WO | WO 2013-159332 | 10/2013 |

OTHER PUBLICATIONS

Search Report for CN Application No. 201210214197.X, mailed on Aug. 22, 2014, 2 pp.

Supplementary European Search Report for EP 12875480, dated Oct. 21, 2015, 2 pp.

* cited by examiner

OPTICAL FIBER CONNECTOR

BACKGROUND

1. Field of the Invention

The present invention is directed to an optical connector.

2. Related Art

Mechanical optical fiber connectors for the telecommunications industry are known. For example, LC, ST, FC, and SC optical connectors are widely used.

However, commercially available optical connectors are not well suited for outside plant field installations. Typically, an adhesive is required to mount these types of ferrule-based connectors on to an optical fiber. The process of bonding the fiber to the ferrule can be awkward and time consuming to perform in the field. Also post-assembly polishing requires that the craftsman have a higher degree of skill.

Remote grip optical fiber connectors are also known, such as those described in U.S. Pat. Nos. 5,337,390 and 7,775,726. These connectors employ a mechanical gripping element to secure the optical fiber as opposed to an adhesive.

Also known are hybrid optical splice connectors, as described in JP Patent No. 3445479, JP Application No. 2004-210251 (WO 2006/019516) and JP Application No. 2004-210357 (WO 2006/019515). However, these hybrid splice connectors are not compatible with standard connector formats and require significant piecewise assembly of the connector in the field. The handling and orientation of multiple small pieces of the connector can result in incorrect connector assembly that may either result in decreased performance or increase the chance of damaging the fiber.

Also known are connectors that incorporate fiber stubs that are factory installed. In these connectors, the back end of the stub fiber is mechanically spliced to a field fiber, where an index matching gel is used to fill the gap between the back end of the fiber stub and the front end of the terminated fiber. For outdoor applications, especially for environments that can undergo a wide temperature variation, the index of refraction of the gel may change as a function of temperature leading to more reflections, thus limiting the connector performance in those particular applications.

Another effect that can occur is movement of the fiber ends relative to each other, caused by differential thermal expansion over the temperature range. For ferrules with stubs bonded in place, if the fiber protrusion from the ferrule end is too great, excessive forces can be applied to the fiber end when mated with another connector, which can fracture the bond line and cause mating failure.

SUMMARY OF THE INVENTION

According to a first aspect of the present invention, an optical connector for terminating an optical fiber comprises a housing configured to mate with a receptacle and a gripping device to grip an optical fiber, the gripping device including a fiber gripping element and an actuating cap configured to engage the gripping element. A collar body includes a ferrule securely disposed in an opening of the collar body, the ferrule including a central bore that defines an axis. The collar body also includes a housing portion disposed in a generally central portion of the collar body with an opening to receive the gripping device. The gripping element comprises a ductile material having a focus hinge that couples first and second element arms and wherein a first portion of the gripping element includes a fiber gripping channel to clamp an optical fiber received therein upon actuation by the actuating cap. A backbone retains the collar body within the housing, the backbone including a fiber jacket clamping portion to clamp a jacket portion of the optical fiber. A boot is attachable to a portion of the backbone, wherein the boot actuates the fiber jacket clamping portion of the backbone upon attachment to the backbone.

According to another aspect, the connector is thermally balanced over a temperature range of at least 100° C.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

Figure 1A:
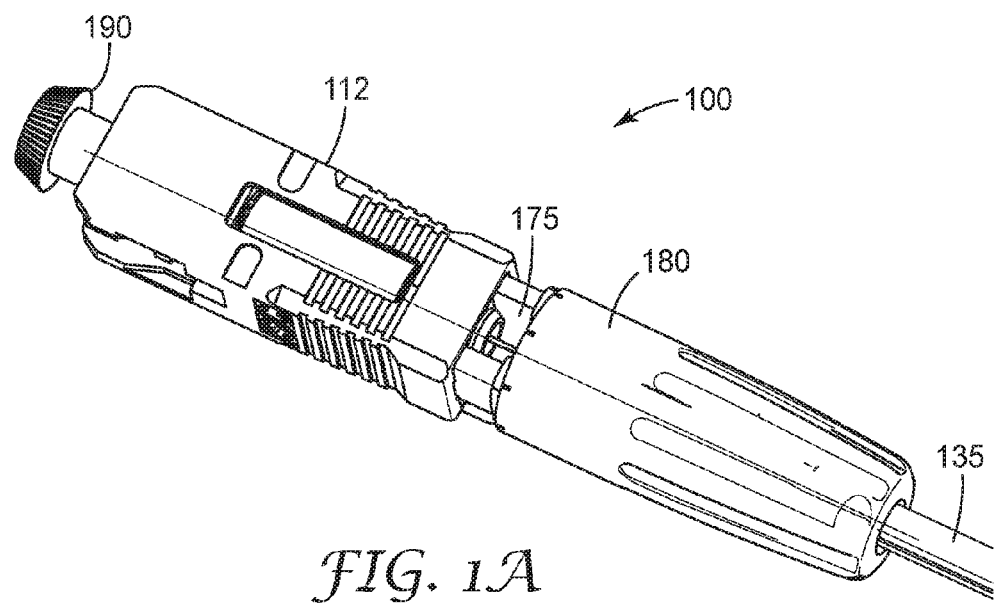
FIGS. 1A and 1B are isometric views of an optical fiber connector according to an aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to an optical connector. In particular, the optical fiber connector of the exemplary embodiments is of compact length and is capable of straightforward field termination. Further, the optical fiber connector utilizes a remote gripping mechanism that avoids the need for a fiber stub mounted within the connector ferrule. A straightforward field termination can be accomplished without the use of a connector termination platform or separate crimping tool. The exemplary connector(s) described herein can be readily installed and utilized for Fiber To The Home (FTTH) and/or Fiber To The X (FTTX) network installations. The exemplary connector(s) can be utilized in installation environments that require ease of use when handling multiple connections, especially where labor costs are more expensive.

Figure 1B:
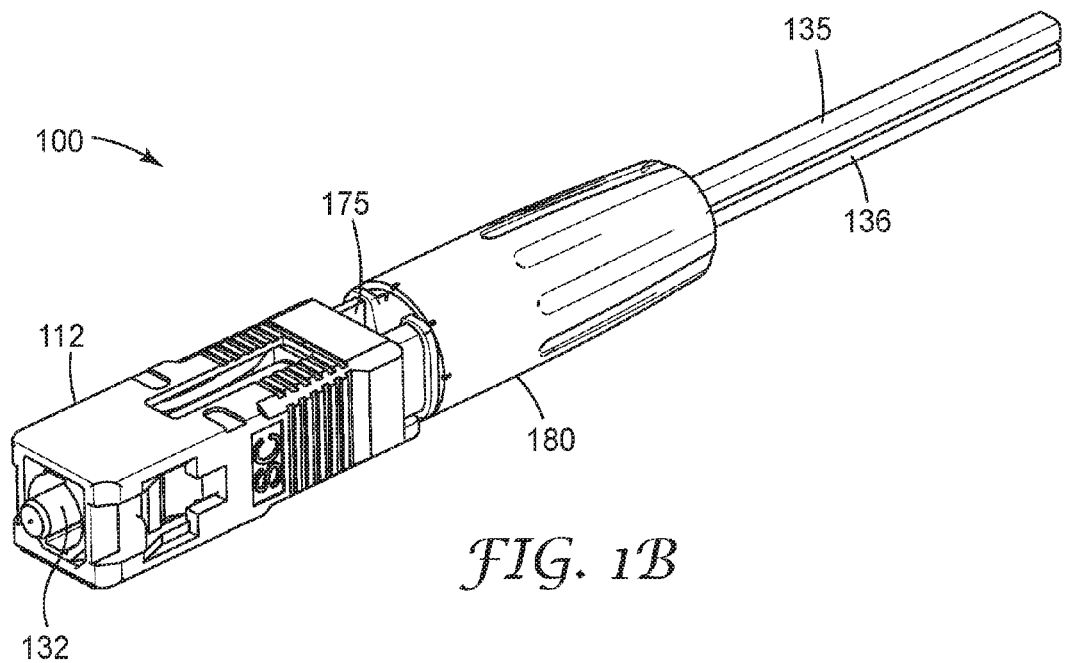

FIGS. 1A and 1B show an optical connector 100 configured to mate with a receptacle of a corresponding format. For example, as shown in FIG. 1A, exemplary optical connector 100 is configured as having an SC format. However, as would be apparent to one of ordinary skill in the art given the present description, optical connectors having other standard formats, such as ST, FC, and LC connector formats, can also be provided.

As shown in FIG. 1A, SC-type optical fiber connector 100 can include a connector body having a housing 112 and a fiber boot 180. An end cap 190 can be placed at the front end of the connector to protect the connector ferrule 132 (see FIG. 1B) when not in use. As described in more detail below, end cap 190 further provides a protrusion setting mechanism for use during the field termination process. Connector 100 also provides an opening 175 that allows the field installer to monitor the termination process during fiber insertion.

Figure 2:
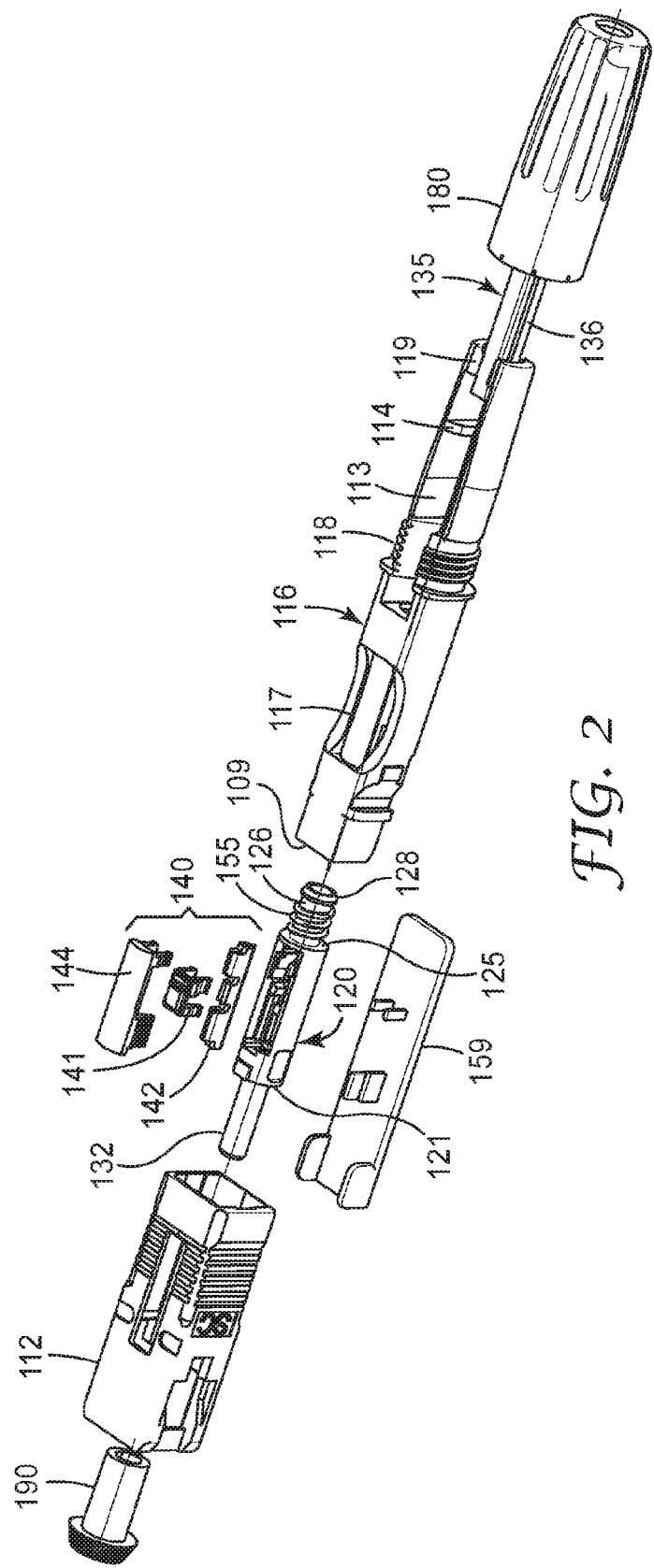
FIG. 2 is an exploded view of an optical fiber connector according to an aspect of the invention.

Connector 100 includes a housing 112 having an outer shell configured to be received in an SC receptacle (e.g., an SC coupling, an SC adapter, or an SC socket). As shown in FIG. 2, connector 100 also includes a collar body 120 (which can also be referred to as a barrel) to house a ferrule and a gripping device, a multi-purpose backbone 116 that retains the collar body 120 within the connector, and a boot 180.

In this exemplary embodiment, connector 100 can be utilized to terminate a field optical fiber cable 135. Optical fiber cable 135 is a jacketed cable that includes an outer jacket 136, a coated (e.g., with a buffer coating or the like) portion 137 (see e.g., FIG. 3C), and a fiber (e.g., bare glass) portion 138 (see e.g., FIG. 3E). In one aspect, cable 135 comprises a rectangular-shaped cable, such as an FRP cable, commercially available from a variety of vendors. In alternative aspects, the optical fiber cable further comprises a standard cylindrically shaped cable structure. In some aspects, the optical fiber cable can further include aramid, Kevlar, or polyester strands/yarn strength members disposed between an inner surface of the fiber jacket 136 and an outer surface of coated portion 137.

In one aspect, a backbone 116 (see e.g., FIGS. 2 and 5) provides structural support for the connector 100. In a further aspect, the backbone 116 is an elongated structure (having a length of from about 40 mm to about 60 mm, such as about 50 mm) that also provides clamping for the outer jacket of the optical fiber cable being terminated in the field. In an alternative aspect, for optical fiber cables with strength members, the backbone 116 can provide further axial strain relief by providing a clamping surface for the strength members of the optical fiber being terminated.

Figure 5:
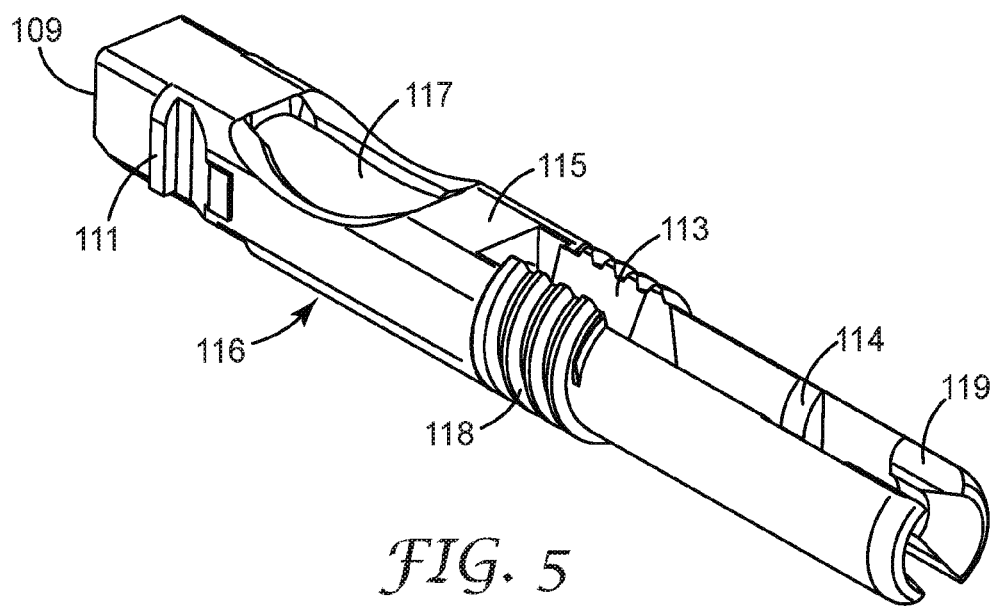
FIG. 5 is an isometric view of the backbone of the optical fiber connector according to an aspect of the invention.

Backbone 116 includes an opening 109 at a front end to allow for insertion of the collar body 120. Backbone 116 further includes an access opening 117, which can provide access to actuate a mechanical gripping device disposed within the connector collar body. In a preferred aspect, as is shown in FIG. 5, access opening 117 can have a cut-out or shallow depression formed on the sides to accommodate a user's thumb or finger during actuation of the gripping device. The backbone 116 has an axial bore throughout to permit passage of the optical fiber being terminated. As is also shown in more detail in FIG. 5, backbone 116 can further include a mounting structure 118 that provides for coupling to the fiber boot 180. In an exemplary aspect, the mounting structure comprises a threaded surface formed on an outer portion of backbone 116 that is configured to engage a corresponding threaded surface 184 of the boot 180 (see FIG. 6). While this embodiment shows mounting of the boot 180 to the backbone 116 via threaded mounting, other mounting structures can be utilized, such as mounting clips or snap features, to name a few. Also, for terminating fiber cables having loose strength members, the mounting structure 118 can provide a retention area for securing the strength members of the optical fiber cable being terminated.

In addition, the backbone can include a fiber guide 113 formed in an interior portion therein to provide axial alignment support for the optical fiber cable being terminated. In an exemplary aspect, the fiber guide portion 113 is a funnel-shaped channel or groove that aligns a buffered portion of the optical fiber and guides the fiber toward the mechanical gripping device 140 housed in the collar body 120.

Figure 3A:
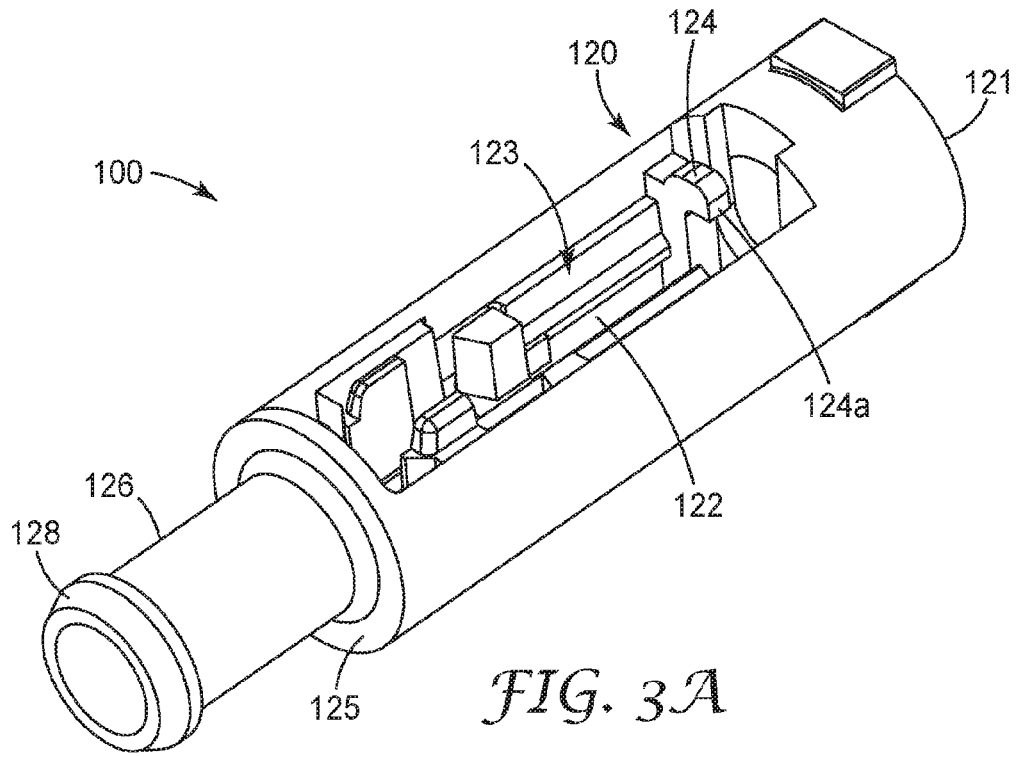
FIGS. 3A-3E are various views of the collar body of the optical fiber connector according to an aspect of the invention.
Figure 3B:
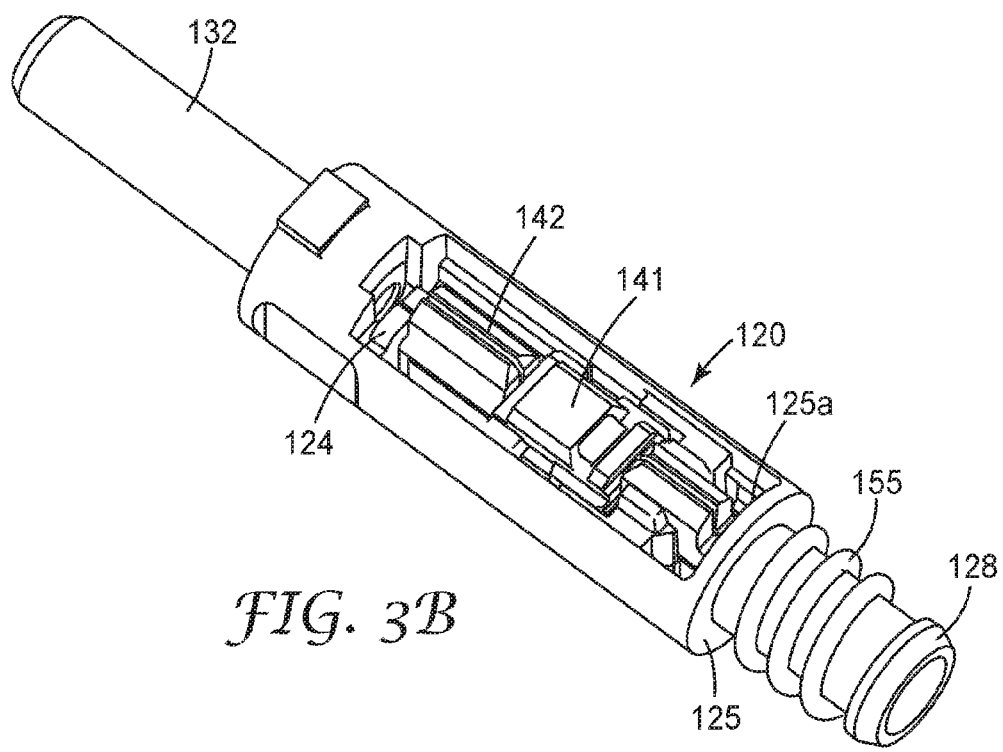

As shown in FIG. 5, the backbone 116 also includes a collar body mount structure 115 configured to receive and secure the collar body 120 within the backbone. In a preferred aspect, collar body mount structure 115 comprises a rigid structure formed in an interior region of backbone 116 having an axial bore therethrough. The axial bore can be of appropriate size to receive and engage raised end structures 128 of collar body 120 (see FIG. 3A). In addition, collar body mount structure 115 also forms a shoulder that can be used as a flange to provide resistance against spring 155 that is positioned over the second end portion 126 of the collar body 120. The spring 155 provides and maintains an adequate contact force when two connectors are joined together.

Backbone 116 can further include one or more stops 114 formed on an interior portion thereof to provide a boundary for the insertion of the jacketed portion 136 of the optical fiber cable 135 being terminated (as explained in more detail below). In addition, backbone 116 includes a clamping portion 119 formed at one an end of the backbone. The clamping portion 119 is configured to clamp onto the jacket portion 136 of the optical fiber cable 135 being terminated in connector 100. In a preferred aspect, clamping portion 119 comprises a collet-type, split body shape that is actuated when the boot is secured to mounting structure 118. The clamping portion 119 can include raised inner surfaces to permit ready clamping of the cable jacket portion 136. In an alternative aspect, the connector can also include an adapter tube to be placed over the cable jacket portion of the optical fiber cable, for example, when the optical fiber cable being clamped is of a smaller diameter. In addition, the clamping portion 119 also can provide a guide structure when inserting fiber cable 135 during the termination process.

Figure 6:
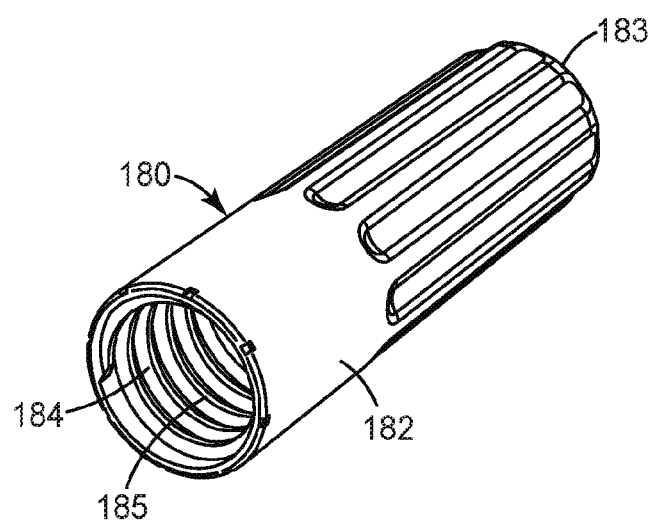
FIG. 6 is an isometric view of the boot of the optical fiber connector according to an aspect of the invention.

As shown in FIG. 6, boot 180 includes a tapered body 182 having an axial bore throughout. The boot 180 includes threaded grooves 184 formed on an inner surface of the body 182 at the opening 185, where the grooves are configured to engage with the correspondingly threaded mounting structure 118 of the backbone 116. In addition, the axial length of boot 180 is configured such that a rear section 183 of the boot, which has a smaller opening than at front opening 185, engages the jacket clamp portion 119 of the backbone. For example, as is explained in more detail below, as the boot 180 is secured onto the mounting structure 118 of the backbone, the axial movement of the boot relative to the backbone forces the legs of clamp portion 119 to move radially inwards so that the fiber jacket 136 is tightly gripped. In alternative aspects, for certain types of fiber cables, the strength members of the optical fiber cable can be disposed between the boot and the threaded mounting structure 118 to secure the strength members as the boot is installed. This construction can also provide a connector termination capable of surviving rougher handling and greater pull forces.

According to an exemplary embodiment of the present invention, housing 112 and backbone 116 are formed or molded from a polymer material, although other suitably rigid materials can also be utilized. Housing 112 is preferably secured to an outer surface of backbone 116 via snap fit (see e.g., outer engagement surface 111 shown in FIG. 5). In an exemplary aspect, boot 180 is formed from a rigid material. For example, one exemplary material can comprise a fiberglass reinforced polyphenylene sulfide compound material. In one aspect, the materials used to form boot 180 and backbone 116 are different materials. In another aspect, the materials used to form the boot 180 and the backbone 116 can be the same.

FIGS. 3A-3E provide a more detailed view of collar body 120. Collar body 120 includes a first end portion 121 having an opening to receive and house a ferrule 132. Ferrule 132 has a central bore formed therethrough to allow passage of the fiber being terminated. Ferrule 132 can be formed from a ceramic, glass, plastic, or metal material to support the optical fiber being inserted and terminated. In a first exemplary aspect, ferrule 132 is a ceramic ferrule. In another exemplary aspect, ferrule 132 is a glass ferrule. The choice of suitable materials for the ferrule can be made in accordance with temperature stability parameters for the desired connector application. The fiber being terminated in the connector can comprise a standard single mode or multimode optical fiber. In one aspect, the fiber being terminated has a glass portion 138 with a diameter of about 125 µm and a buffer portion 137 with a diameter of about 250 µm.

In one aspect, the opening 121 of collar body 120 is overmolded onto the end of ferrule 132 to secure the ferrule to the collar body. In addition, the ferrule may optionally include a cross-groove that helps create a mechanical interference to prevent the ferrule 132 from being easily pulled away from the collar body 120. In an alternative aspect, the ferrule 132 can be secured within the collar body portion via an epoxy or other suitable adhesive.

Collar body 120 further includes a housing portion 123 that provides an opening 122 in which the gripping device 140 can be inserted in the central cavity of collar body 120. In an exemplary embodiment, the collar body provides for a limited axial displacement of the gripping device 140 due to thermal expansion/contraction.

The gripping element 142 of the gripping device 140 is mountable in a mounting device or cradle 143 (partially shown in FIGS. 4G and 4H) located in portion 123 of collar body 120. In an exemplary embodiment, cradle 143 is integrally formed in collar body 120, e.g., by molding. Cradle 143 can be used to help secure (through e.g., snug or snap-fit) the axial and lateral position of the gripping element 142 in conjunction with an element cap 141, described in further detail below.

Depending on the size of the gripping element, one or more clips 124 can be disposed into the housing portion 123 to provide positioning structures to limit movement of the element 142. For example, in one aspect, clip 124 can be positioned at an end of the housing portion 123 closest to the ferrule 132, such as shown in FIG. 3E. Clip 124 is designed to have an over-hanging portion 124a (see FIG. 3A) that is configured to fit over an end portion of the gripping element 142 when the gripping element is seated on the cradle 143. The clip can be formed having a flexing piece or hinge to allow insertion of the element into the housing portion 123. The clip 124 can prevent the gripping element end from lifting during a connection to or disconnection from a receptacle, which reduces the likelihood of fiber damage or breakage.

Figure 3C:
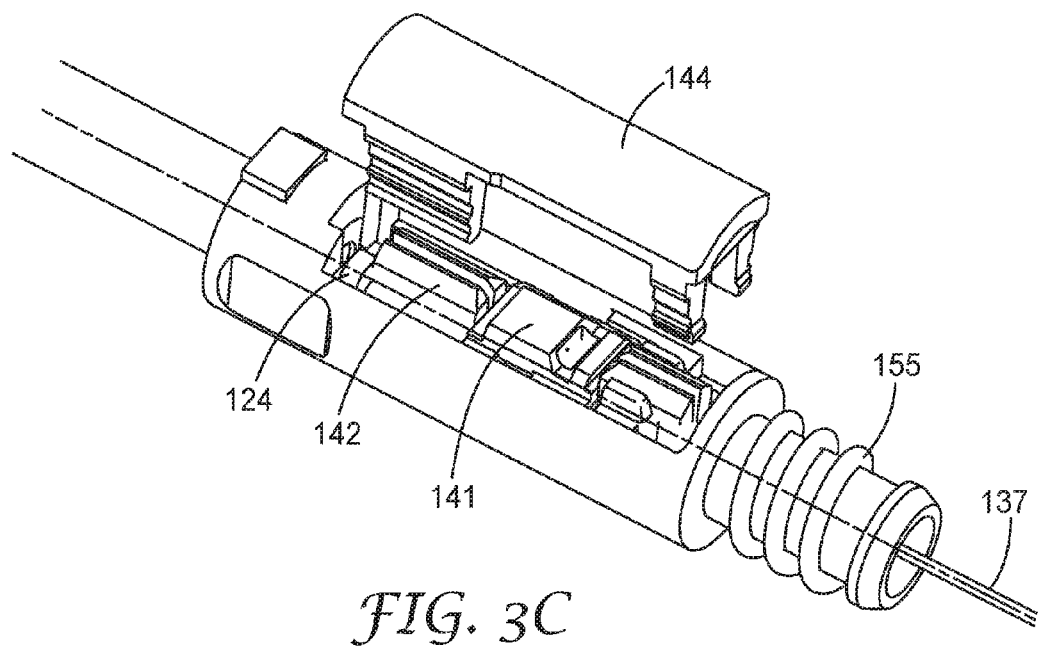
Figure 3D:
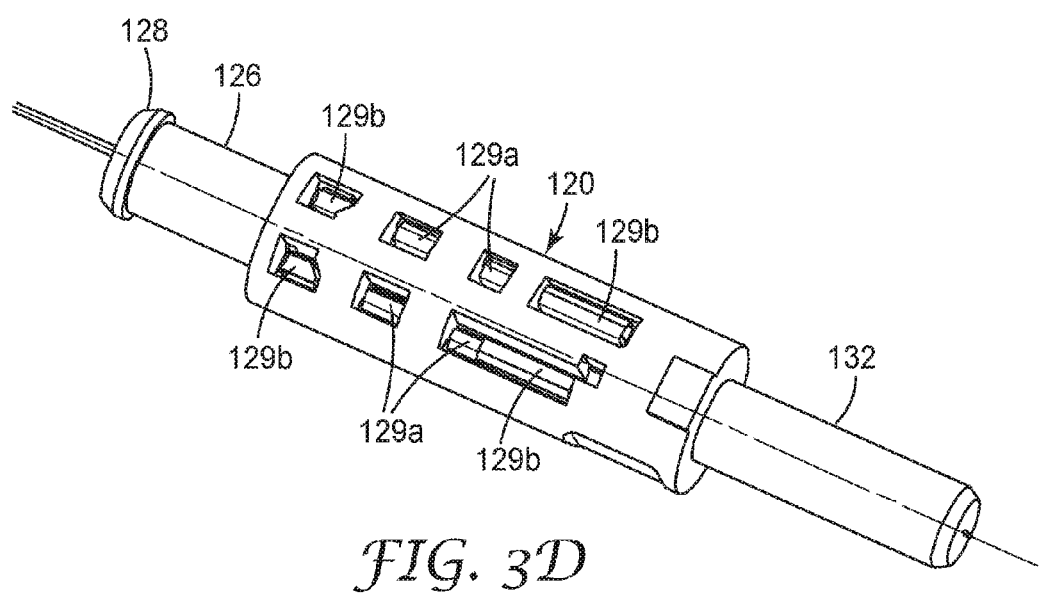
Figure 3E:
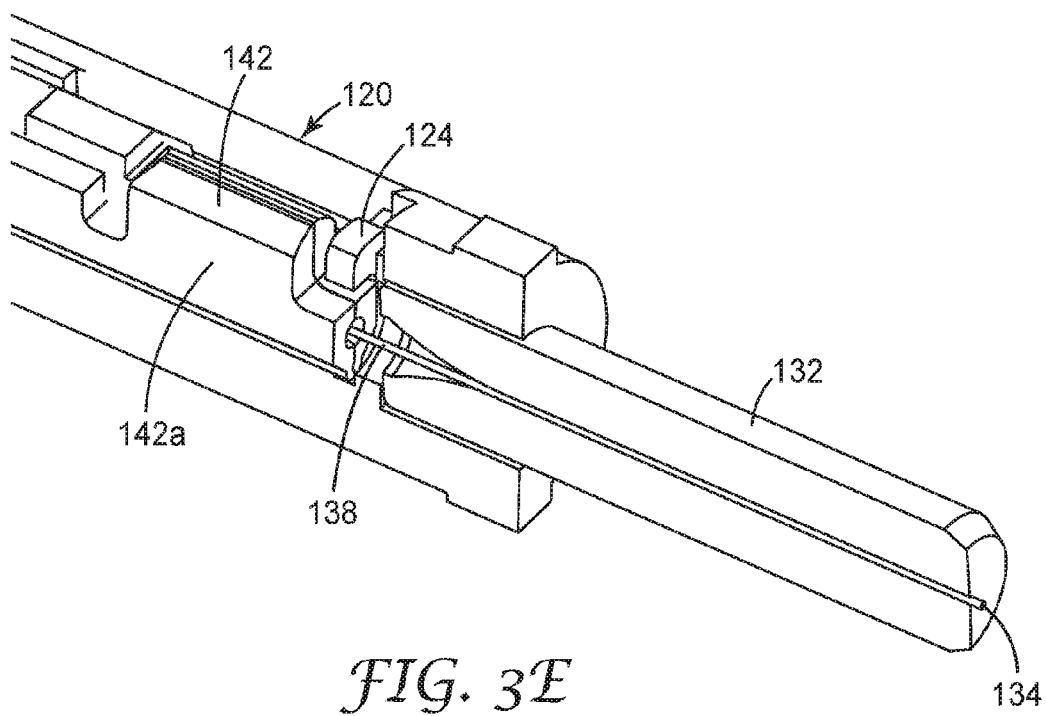

The collar body 120 can also include an outer collar or shoulder 125 that can be used as a flange to provide resistance against spring 155 (see e.g., FIG. 3C).

The collar body also includes a second end portion 126 configured to engage with the collar body mount structure 115 of backbone 116. In a preferred aspect, second end portion 126 has a raised structure portion 128 that has a sloping shape that is insertable through the bore of backbone 116, as is shown in FIG. 2. Raised structure 128 of the second end portion can be inserted into the bore and engage against backbone mount structure 115 due to the bias of the spring 155.

As is shown in FIGS. 4A-4H, the gripping device 140 can include a gripping element 142, an element cap 141 and an actuating cap 144. Gripping element 142 is mountable in the cradle 143 of housing portion 123 of collar body 120 such that it is substantially secured therein. When the gripping element 142 is placed in the cradle or nest 143, a portion of the element can be registered against a wall or clip (such as clip 124) disposed in the housing portion 123. The element cap 141 (see FIGS. 4C and 4D) is configured to secure the gripping element 142 in the cradle 143. In one aspect, an inner surface 125a (see FIG. 3B) provides a registration surface on which an edge of the element 142 can be positioned against by the securing of the element cap 141. In this embodiment, element cap 141 includes a set of front legs 141a and a set of rear legs 141b disposed on either end of cap structure 141e. In this aspect, the element cap 141 is configured to straddle a central portion 142c (see FIG. 4E) of the gripping element 142. Element cap 141 can be secured within the housing portion 123 (e.g., via snap fit) when the end portions of front and rear legs 141a, 141b engage with receiving slots 129a formed on the bottom portion of the collar body 120 (see FIG. 3D).

Figure 4A:
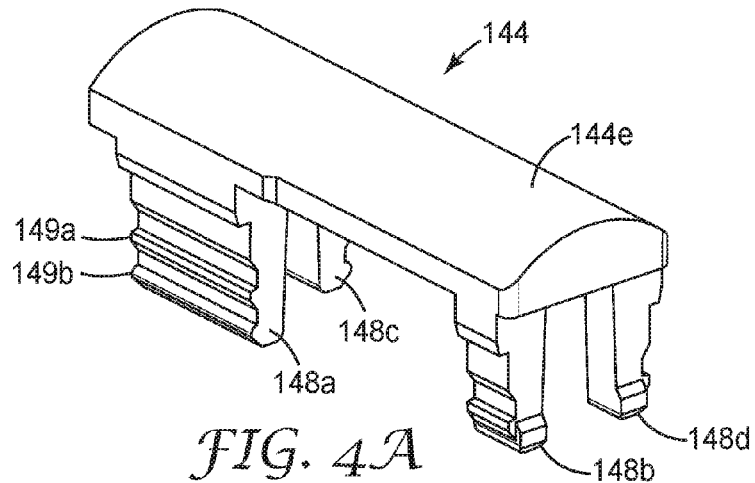
FIGS. 4A-4H are various views of the gripping device of the optical fiber connector according to an aspect of the invention.
Figure 4B:
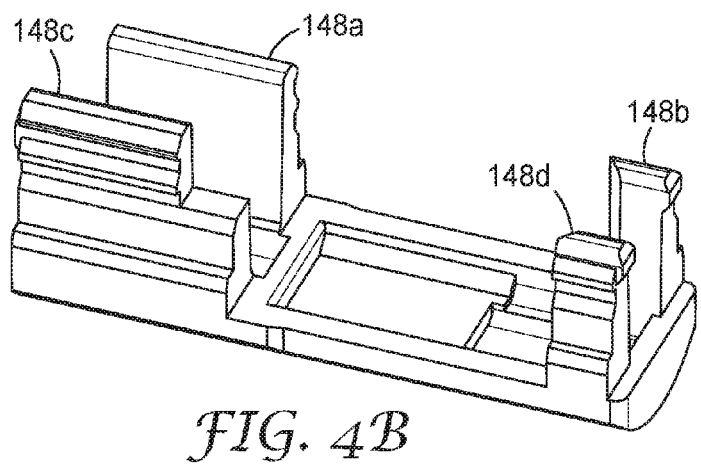
Figure 4C:
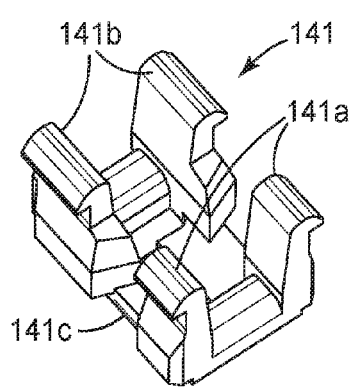
Figure 4D:
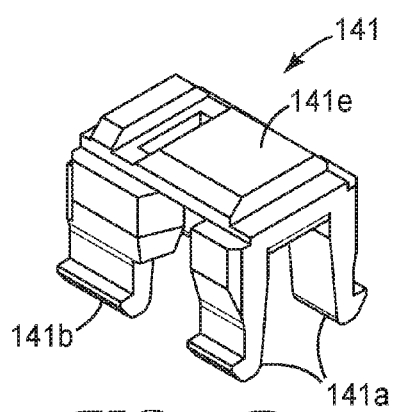
Figure 4E:
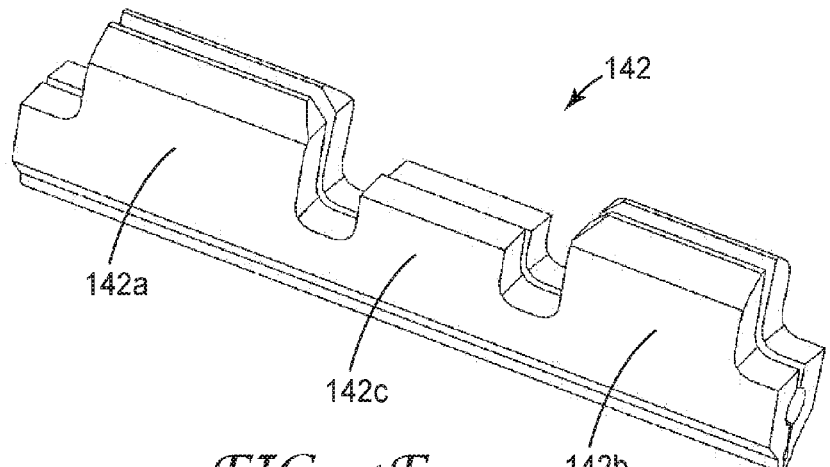

FIG. 4E shows a close-up view of gripping element 142. Gripping element 142 includes a front portion 142a, a rear portion 142b, and a central portion 142c formed between, where front portion 142a is disposed closer to the ferrule than rear portion 142b. In a one aspect, the gripping element 142 comprises a sheet of ductile material having a focus hinge that couples two arms, where one or both of the arms includes a fiber gripping channel (e.g., a V-type, channel type or U-type groove or a mixture of groove shapes) to optimize clamping forces for a conventional glass optical fiber received therein. In an aspect of the invention, element front portion 142a includes a fiber gripping channel configured to grip the bare glass portion 138 of the fiber when actuated. The element rear portion 142b includes a larger channel formed therein that helps guide the fiber through the element 142 during the field fiber insertion process.

In operation, when a prepared fiber is inserted into connector 100 for field termination, the fiber end is stripped of the cable jacket and buffer coating, exposing only the bare glass portion 138 and fiber tip 134 (see FIG. 3E). This portion of the fiber is gripped by element front portion 142a when this element portion is actuated by actuation cap 144. In addition, another portion of the fiber is stripped of the cable jacket, leaving the buffer portion 137 exposed. This buffer portion 137 of the fiber is guided through element rear portion 142a. In this aspect, the central portion 142c is not configured to provide any additional fiber gripping, but rather provide a structure to be engaged by element cap 141.

In one embodiment, the element 142 can include a V-groove in one leg and a channel groove in the second leg to yield a three line contact region in at least one of the front and rear portions. The ductile material, for example, can be aluminum or anodized aluminum. Gripping device 140 allows a field technician to grip different portions of the optical fiber being terminated remotely from the ferrule. Alternatively, gripping device 140 can be designed to have a shape similar to that of a conventional mechanical splice device, as would be apparent to one of ordinary skill in the art. For example, in one alternative aspect, the gripping device can include a wedge actuated mechanical gripping element.

Actuating cap 144 is preferably configured to engage the gripping element 142 such that the element 142 grips a fiber inserted therein. The actuating cap can be formed or molded from a polymer material, although metal and other suitable materials can also be utilized. In one aspect, the actuating cap 144 can be formed from a material being the same as the material forming the gripping element 142.

In more detail, actuating cap 144 includes four retention legs 148a-148d (see e.g., FIGS. 4A-4B) to retain the position of the actuating cap within the collar body 120 and to fit over element cap 141. For example, each of the retention legs 148a-148d can include detents 149a and 149b formed on an outer surface thereof, such as shown in FIG. 4A. The first detent(s) 149a can be used to place the cap securely within the nest 143 of the collar body 120 prior to actuation. As the cap 144 is fully actuated onto the element 142, the second detent(s) 149b can engage with the collar body to further secure the cap 144 in place. The front legs 148a, 148c are configured to actuate the element arms of the front portion 142a of gripping element 142.

Further, in this exemplary aspect, cap 144 can include reinforcing walls at both ends of the camming surfaces on the underside of the cap. These walls can provide structural strength to hold the element 142 legs in their actuated position.

In this exemplary aspect, the actuating cap 144 is secured to a portion of the collar body 120 and thus has controlled axial movement due to thermal expansion. As mentioned previously, the element cap 141 (see FIGS. 4C and 4D) can secure the gripping element 142 so that the element and collar body are registered to the same datum.

Figure 4F:
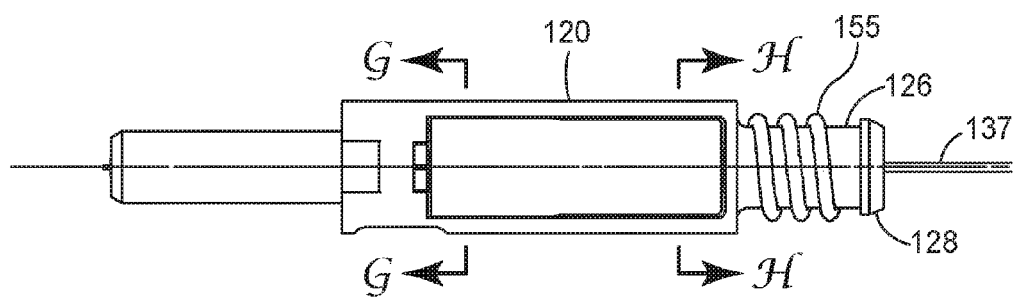
Figure 4G:
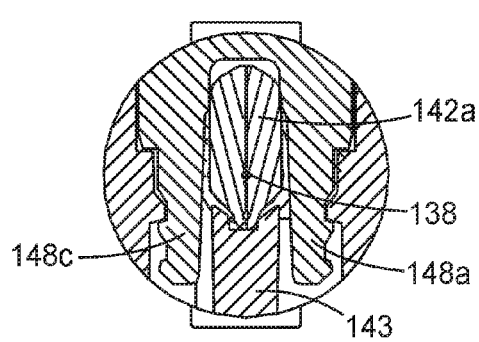
Figure 4H:
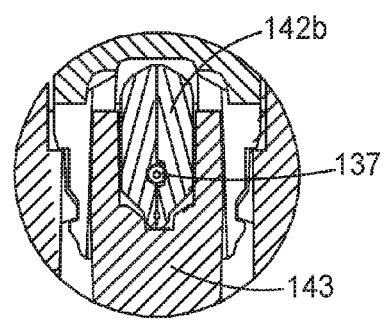

In operation, the cap 144 can be moved from an open position to a closed position (e.g. downward in the embodiment depicted in FIG. 2) by placing a pressing force onto the cap structure 144e. As the cap is moved onto the element 142, the interior surfaces of front cap legs can slide over the element arms, urging them toward one another. As mentioned above, the glass portion 138 of the fiber being terminated is placed in a groove formed in front element potion 142a and is gripped as the element arms are moved toward one another by the cap 144. FIG. 4F shows a top view of the collar body 120 and actuating cap 144 after actuation. FIGS. 4G and 4H show respective cross section views of the front and rear portions of the element 142 after actuation, where the element arms of front portion 142a are closed towards each other by actuating cap legs 148a and 148c.

In an alternative aspect, an actuating cap with a material having at least a similar coefficient of thermal expansion (CTE) as the element can be utilized.

Figure 7:
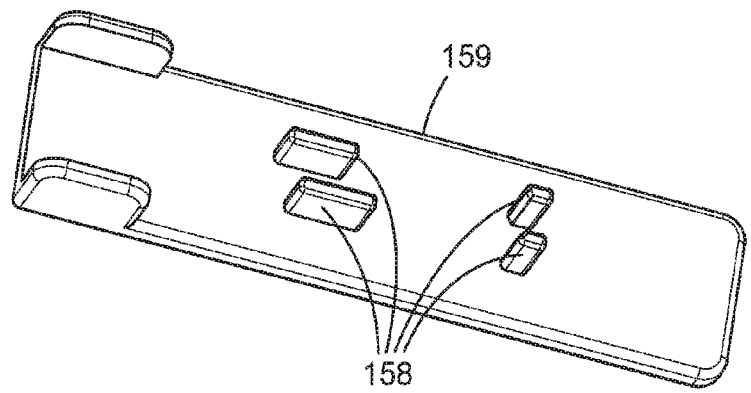
FIG. 7 is an isometric view of the gripping device removal tool of the optical fiber connector according to an aspect of the invention.

The actuating cap 144 can be removed via use of a tool, such as tool 159 shown in FIG. 7. Tool 159 is a structure having a plurality of extension posts 158 that are configured to extend through pass-through slots 129b formed in the bottom surface of collar body 120 (see FIG. 3D) when the tool 159 is placed onto the appropriate side of the connector 100. The pass through slots 129b are positioned to correspond to the location of the ends of the actuating cap legs when the actuating cap is fully inserted into the collar body. A pressing force against the tool will insert the extension posts 158 into the pass-through slots 129b causing contact with the legs of the actuating cap 144, displacing the actuating cap 144 from the gripping element 142. As such, with the connector described herein, a field technician can re-position the terminating fiber if needed.

Figure 8A:
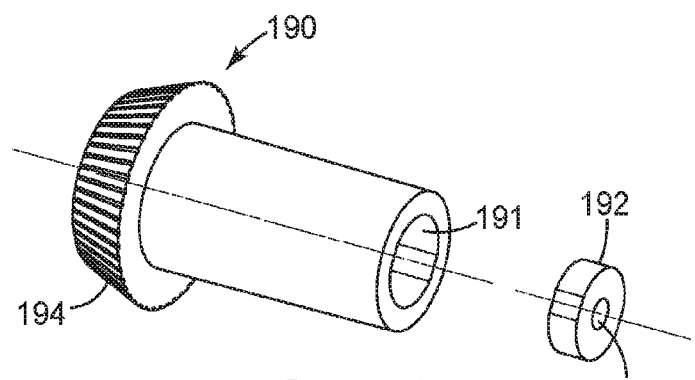
FIGS. 8A and 8B are views of the end cap of the optical fiber connector according to an aspect of the invention.
Figure 8B:
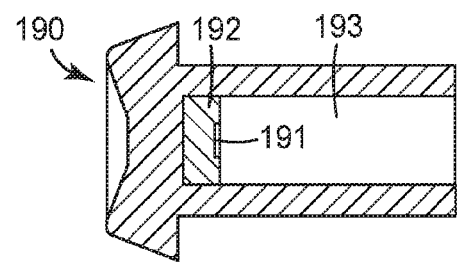

In another aspect of the invention, connector 100 further includes an end cap 190 that provides protection for the fiber tip and ferrule end when not in use. In addition, end cap 190 also provides a protrusion setting mechanism for during field termination. As shown in FIGS. 8A and 8B, end cap 190 includes a tube-like structure having a bore 191 formed therein that extends from the cap structure 194. A disk-shaped insert 192 can be provided within the bore 191 and is positioned against the cap structure 194, as is shown in FIG. 8B. The insert has a depression 193 of a controlled depth that can be used as a stop against the end of the fiber being terminated in the field. In one aspect, the cap structure is formed from plastic and the insert 192 is formed from a metal, which can provide a more controllable depth. For example, end cap 190 can be utilized to provide for a fiber protrusion of about 30 µm. In another aspect, different inserts can be utilized to provide different protrusion amounts, depending on the application.

In another exemplary aspect, a field termination procedure is provided. The optical fiber can then be prepared by stripping and cleaving flat using a conventional cleaver. The fiber jacket/plastic coating can be stripped using a conventional mechanical fiber stripper. The glass portion of the fiber can be wiped clean.

After the fiber end is prepared, the stripped portion of the fiber can be inserted in the connector, particularly within the collar body until the fiber tip reaches beyond the ferrule end face 233 by a desired amount, until it contacts the depression 193 of insert 192 of end cap 190. The actuating cap 244 can be pressed onto the element 242 to grip the glass fiber and the buffer clamp 226 can be actuated to clamp the buffer portion of the fiber.

With the fiber secured by the gripping element, in a preferred aspect, the fiber tip/ferrule end face is polished using a conventional field polishing procedure such that the fiber tip is flush with the ferrule end face. Alternatively, a field polish to produce a slight fiber protrusion can be performed.

As mentioned above, the optical fiber connector of the exemplary embodiments is of compact length and is capable of straightforward field termination without the use of a connector termination platform or separate crimping tool.

An exemplary termination process is now described. In one aspect, a partially assembled optical fiber connector is provided to the field installer, with the gripping element 142 and element cap 141 already installed in the collar body 120, which includes the ferrule 132 secured therein. The outer shell of the housing is preferably removed, but can be present as well in alternative aspects. The collar body 120 can be further pre-installed in the backbone 116, where the raised structure 128 of the collar body is inserted into the bore of structure 115. The spring 155 will provide some bias against axial movement after insertion.

For field termination, optical fiber cable 135 is prepared by cutting off a portion of the fiber cable jacket 136 and stripping off a coated portion of the fiber near the terminating fiber end to leave a bare fiber portion 138 and cleaving (flat or angled) the fiber end 134. In an exemplary aspect, about 50 mm to about 70 mm, in some aspects about 60 mm, of the jacket 136 can be removed, leaving about 20 mm-30 mm of stripped fiber and about 25 mm to about 35 mm of buffer coating exposed. For example, a commercial fiber cleaver such as an Ilsintech MAX CI-01 or the Ilsintech MAX CI-08, available from Ilsintech, Korea (not shown) can be utilized to provide a flat or an angled cleave. Alternatively, a low cost cleaver, such as is described in WO 2009/051918, WO 2010/120570, or WO 2011 025929 can be utilized to provide a flat or an angled cleave.

After the fiber end is prepared, the stripped portion of the fiber can be inserted into the connector (the boot 180 can be placed further back onto the fiber cable for securing at a later time). In particular, the optical fiber cable 135 can be inserted in a direction through the rear end of the connector (i.e., through the clamping portion 119 of the connector backbone) towards the ferrule. The stops 114 formed on an interior portion of the backbone 116 provide a boundary to stop further insertion of the jacketed portion 136 of the optical fiber cable 135. In this manner, the prepared fiber end can be guided through the gripping element 142 disposed within the collar body until the fiber tip 134 protrudes beyond the ferrule end face by a desired amount, as can be set by the insert 192 of the end cap 190. As the fiber tip contacts the insert 192 of the end cap, the fiber will begin to bow, as can be observed through connector opening 175. At this point, the boot is not yet mounted, making it easier to observe the fiber bow.

The gripping device can then be actuated while the fiber is subject to an appropriate end loading force. To actuate the gripping device, the actuating cap 144 can be pressed onto the gripping element 142 to grip the glass fiber. In one aspect, the installer can press downward (with a modest thumb or finger force) onto actuating cap 144 of the gripping device 140. The fiber bow can be released by slightly pulling back on the fiber cable. The boot 180 can be pushed axially toward the backbone mounting section 118 and then screwed onto the backbone mounting section, tightening the collet-style clamping portion 119 onto the fiber jacket.

If the outer shell is not previously installed, the outer shell of the housing 112 can be placed over the backbone/collar body structure.

With the fiber installed, the fiber end 134 can be polished using a device and process as described in a co-pending PCT Publication No. WO 2013/15332, entitled "Optical Fiber Connector Polishing Apparatus and Method" and filed on the same date herewith.

Thus, the above termination procedure can be accomplished without the use of any additional fiber termination platform or specialized tool. The optical connector is re-usable in that the actuating cap can be removed using device 159, as discussed above.

As mentioned above, the optical connector of the exemplary embodiments is of compact length and is capable of straightforward field termination with reduced assembly times. Such exemplary connectors can be readily installed and utilized for FTTP and/or FTTX network installations.

In addition to the structure described above, the optical connector of the present invention can be thermally balanced so as to effectively operate over a wide temperature range. In one aspect, the materials used to form components of the connector 100 are selected such that the thermal behavior of the gripping element 142 and glass fiber 138 gripped therein substantially matches the thermal behavior of the collar body 120 and ferule 132.

For example, in one aspect of the invention, optical connector 100 can include a collar body 120 and an actuation cap 144 made from the same material, but each having a different CTE in the direction of the fiber axis. In particular, the actuation cap can have a CTE in the direction of the fiber axis that is substantially different from the CTE of the collar body in this same direction. As a result, the optical fiber connector can be thermally balanced over a substantial (i.e., greater than 100° C.) temperature range (e.g., from −40° C. to 80° C.).

Structurally, collar body 120 can include a first end portion 121 having an opening to receive and house ferrule 132. Ferrule 132 can be formed from a ceramic, glass, plastic, or metal material to support the optical fiber being inserted and terminated. In a first aspect, ferrule 132 comprises a ceramic ferrule. In another aspect, ferrule 132 can be a glass ferrule. The fiber being terminated in the connector can comprise a standard single mode or multimode optical fiber. Ferrule 132 can be secured within the collar body portion via over-molding, as described above. In this aspect, collar body 120 can be formed or molded from a polymer material, in particular, a polymer material having an anisotropic CTE.

In this aspect, the gripping device 140 includes an element 142, an element cap 141 and an actuating cap 144. Gripping element 142 is mountable in the housing portion of collar body 120 within an element cradle or nest 143. In one aspect, the gripping element 142 comprises a sheet of ductile material having a focus hinge that couples two arms, where each of the arms includes a fiber gripping channel to optimize clamping forces for a conventional glass optical fiber received therein. The ductile material, for example, can be aluminum or anodized aluminum.

In this aspect, gripping element 142 can be secured in the collar body via element cap 141.

Actuating cap 144 can be configured to engage the gripping element 142 such that the element 142 securely grips a fiber inserted therein. In this aspect, the cap walls snugly fit around the element 142. In operation, as the cap 144 is moved from an open position to a closed position (e.g. downward in the embodiment depicted in FIG. 2), one or more cam bars located on an interior portion of the actuating cap 144, can slide over the element arms in one or more of the element sections 142a and 142b, urging the arms toward one another. In one aspect, the gripping force applied to the front element portion 142a (closest to the ferrule 132) is greater that the clamping force applied to the element rear portion 142b. In a further exemplary aspect, the clamping force applied to element rear portion 142b can be substantially zero.

The glass portion 138 of a fiber is placed in the groove of the element 142 and is gripped as the element arms are moved toward one another by actuating cap 144.

According to an aspect of this embodiment, the materials forming caps 141 and 144 can also be selected to help ensure thermal balancing over a large temperature range. For example, the collar body and both caps 141, 144 can be formed or molded from the same polymer material. For example, caps 141, 144 and collar body 120 can be formed from a liquid crystal polymer (LCP). A LCP such as VECTRA LCP A130, available from companies such as Polyplastics Ltd. and Ticona Company, can be utilized. However, in this exemplary aspect, the caps 141 and 144 have a CTE, in the direction of the fiber axis, which is substantially different from the CTE of the collar body 120 in this same direction. As such, the distance between the element 142 and the ferrule 132 decreases in a controlled fashion with increasing temperature. With this structure, the element 142 is constrained along its primary axis within the connector by the cap, as opposed to the collar body.

The LCP material exhibits a first CTE in the direction of flow during the molding process and a second CTE (different from the first CTE) in an orthogonal direction to the flow direction. In this exemplary aspect, the first CTE is less than the second CTE. In this aspect, the caps 141, 144 can have a CTE in the axial direction similar to the CTE of a metal gripping element 142.

In this exemplary aspect, the CTE of the caps and element, along their major axis, is selected to be greater than that of the collar body. As such the front end of the element (closest to the ferrule) can move closer to the back end of the ferrule with increasing temperature. In this manner, the fiber position with respect to the ferrule end can be maintained over a large temperature range.

The optical connectors described above can be used in many conventional optical connector applications such as drop cables and/or jumpers. The optical connectors described above can also be utilized for termination (connectorization) of optical fibers for interconnection and cross connection in optical fiber networks inside a fiber distribution unit at an equipment room or a wall mount patch panel, inside pedestals, cross connect cabinets or closures or inside outlets in premises for optical fiber structured cabling applications. The optical connectors described above can also be used in termination of optical fiber in optical equipment. In addition, one or more of the optical connectors described above can be utilized in alternative applications. Moreover, the connectors described above are designed to be more insensitive to temperature changes and thus can be utilized in a larger range of applications, such as outside plant applications.

Various modifications, equivalent processes, as well as numerous structures to which the present invention may be applicable will be readily apparent to those of skill in the art to which the present invention is directed upon review of the present specification.

We claim:

1. An optical fiber connector, comprising:
   a housing configured to mate with a receptacle;
   a gripping device to grip an optical fiber, the gripping device including a fiber gripping element and an actuating cap configured to engage the gripping element;
   a collar body disposed in the housing, the collar body including
   a ferrule securely disposed in an opening of the collar body, the ferrule including a central bore that defines an axis, and
   a housing portion disposed in a generally central portion of the collar body and having an opening to receive the gripping device, wherein the gripping element comprises a ductile material having a focus hinge that couples first and second element arms and wherein a first portion of the gripping element includes a fiber gripping channel to clamp an optical fiber received therein upon actuation by the actuating cap;
   a backbone to retain the collar body within the housing, the backbone including a fiber jacket clamping portion to clamp a jacket portion of the optical fiber;
   a boot attachable to a portion of the backbone, wherein the boot actuates the fiber jacket clamping portion of the backbone upon attachment to the backbone; and
   a protrusion control device attachable to an end of the housing, wherein the protrusion control device comprises an end cap configured to cover an exposed end of the ferrule, and including a metal disk removably inserted in a bore of the end cap, the metal disk including a depression of a predetermined depth.

2. The optical fiber connector of claim 1, wherein the gripping device further includes an element cap to secure the gripping element in the collar body housing portion.

3. The optical fiber connector of claim 2, wherein engagement of the element cap registers a portion of the element cap against an interior surface of the collar body.

4. The optical fiber connector of claim 3, wherein the element cap is registered against a rear interior surface of the collar body.

5. The optical fiber connector of claim 1, further comprising a clip disposed in the collar body housing portion, wherein the clip includes a structure configured to fit over an end portion of the gripping element when the element is secured in the housing portion.

6. The optical fiber connector of claim 1, wherein the fiber jacket clamping portion comprises a collet-type, split body shape.

7. The optical fiber connector of claim 1, wherein the boot attaches to the backbone via a screw-type mechanism.

8. The optical fiber connector of claim 1, wherein the optical connector is configured to mate with an SC receptacle.

* * * * *